(12) United States Patent
Stuckey et al.

(10) Patent No.: US 11,975,573 B2
(45) Date of Patent: May 7, 2024

(54) INTERNALLY COOLED TIRE-WHEEL SYSTEM

(71) Applicant: BRIDGESTONE AMERICAS TIRE OPERATIONS, LLC, Nashville, TN (US)

(72) Inventors: Jon I. Stuckey, Uniontown, OH (US); Samuel O. Givens, Copley, OH (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 757 days.

(21) Appl. No.: 16/977,532

(22) PCT Filed: Mar. 28, 2019

(86) PCT No.: PCT/US2019/024560
§ 371 (c)(1),
(2) Date: Sep. 2, 2020

(87) PCT Pub. No.: WO2019/204002
PCT Pub. Date: Oct. 24, 2019

(65) Prior Publication Data
US 2021/0001674 A1    Jan. 7, 2021

Related U.S. Application Data

(60) Provisional application No. 62/659,515, filed on Apr. 18, 2018.

(51) Int. Cl.
*B60C 23/18*    (2006.01)
*B60B 21/02*    (2006.01)
*B60C 11/11*    (2006.01)

(52) U.S. Cl.
CPC ............ *B60C 23/18* (2013.01); *B60B 21/02* (2013.01); *B60C 11/11* (2013.01); *B60C 2200/08* (2013.01); *B60C 2200/14* (2013.01)

(58) Field of Classification Search
CPC ......... B60C 23/19; B60C 23/18; B60C 5/004; B60C 5/005
See application file for complete search history.

(56) References Cited

U.S. PATENT DOCUMENTS 2,538,563 A * 1/1951 Isham ................. B60C 23/18
152/153
3,708,006 A   1/1973 King
(Continued)

FOREIGN PATENT DOCUMENTS

DE    202006000765 U1    5/2007
DE    102005050446 A1    6/2007
(Continued)

OTHER PUBLICATIONS

International Search Report and Written Opinion for international application No. PCT/US2019/024560, dated Jul. 10, 2019, 12 pages (not prior art).

*Primary Examiner* — Cedrick S Williams
*Assistant Examiner* — Thomas Frank Schneider (57) ABSTRACT

A pneumatic tire may include a tread, an inner tire surface positioned opposite the tread, and an internal heat exchanger attached to the inner tire surface. The wheel assembly may include a wheel rim, the pneumatic tire, and a pump. The pneumatic tire may be attached to the wheel rim. The pump may be attached to the wheel rim outside of the pneumatic tire and configured to rotate with the wheel rim. The pump may be coupled to the internal heat exchanger through an opening in the wheel rim. The wheel assembly may further include a coolant disposed in the internal heat exchanger and configured to absorb heat from the pneumatic tire. The wheel assembly may also include an external heat exchanger configured to remove heat from the coolant.

16 Claims, 7 Drawing Sheets

(56) References Cited

U.S. PATENT DOCUMENTS

| | | | |
|---|---|---|---|
| 3,867,973 A | 2/1975 | Cozzolino et al. | |
| 3,990,492 A | 11/1976 | Hyndman et al. | |
| 4,130,144 A | 12/1978 | Harris | |
| 4,202,392 A | 5/1980 | Mineur et al. | |
| 4,212,339 A | 7/1980 | Dobson | |
| 4,343,338 A * | 8/1982 | Hart | B60C 23/18 165/41 |
| 4,620,580 A | 11/1986 | Groezinger et al. | |
| 5,083,596 A | 1/1992 | Kato et al. | |
| 5,249,623 A * | 10/1993 | Muller | F23K 5/20 165/169 |
| 5,899,067 A * | 5/1999 | Hageman | F03G 7/06 60/516 |
| 6,619,351 B2 | 9/2003 | Rayman | |
| 7,408,453 B1 | 8/2008 | Breed | |
| 7,591,489 B2 * | 9/2009 | Woo | F16L 23/04 285/365 |
| 8,479,789 B2 | 7/2013 | Hill, III et al. | |
| 9,522,379 B2 | 12/2016 | McAlister | |
| 10,661,485 B2 | 5/2020 | Deschaux et al. | |
| 2005/0051314 A1 * | 3/2005 | Heier | F28F 9/162 165/173 |
| 2011/0220325 A1 | 9/2011 | Hino | |
| 2013/0037194 A1 | 2/2013 | Hino et al. | |
| 2016/0009038 A1 | 1/2016 | Tomoto et al. | |

FOREIGN PATENT DOCUMENTS

| | | |
|---|---|---|
| EP | 0131571 B1 | 8/1987 |
| GB | 2533470 A | 6/2016 |
| JP | 05-024403 U | 3/1993 |
| KR | 100887502 B1 * | 3/2009 |
| WO | 2010139339 A1 | 12/2010 |
| WO | 2014206405 A1 | 12/2014 |
| WO | 2016046322 A1 | 3/2016 |
| WO | 2016162750 A1 | 10/2016 |

* cited by examiner

INTERNALLY COOLED TIRE-WHEEL SYSTEM

A portion of the disclosure of this patent document contains material that is subject to copyright protection. The copyright owner has no objection to the reproduction of the patent document or the patent disclosure, as it appears in the U.S. Patent and Trademark Office patent file or records, but otherwise reserves all copyright rights whatsoever.

CROSS-REFERENCES TO RELATED APPLICATIONS

This application claims benefit of the following patent application(s) which is/are hereby incorporated by reference: None

BACKGROUND OF THE INVENTION

1. Field of the Invention

The present invention relates generally to a system for cooling pneumatic tires.

More particularly, this invention pertains to a system for removing heat from the inner tire surface of pneumatic tires.

2. Description of the Prior Art

A common issue arising with pneumatic tires, specifically off-the-road (OTR), agricultural (AG), and run-flat (RF) tires is breakdown of the rubber modulus due to internal heat buildup. It is well known that the temperatures to which a tire is exposed greatly affects the strength and rate of deterioration of that tire. The number one enemy of tires for durability is heat, both internal and external heat. In run flat (RF) applications, under low/zero pressure internal heat builds up as the tire sidewall (SW) cyclically flexes and carries the load. As heat builds up, the temperature inside the tire increases. As the heat inside the tire increases, the rubber modulus softens leading to an increase in deflection and further increases in heat. This will lead to thermal runaway when the SW modulus reaches a temperature at which rubber will begin to revert, crack and fail in carrying the load.

For some vehicles, especially heavy off-the-road trucks, tractors and the like, this temperature sensitivity of the tires often becomes a dominant operating limitation. For example, run flat tires (RFT) tires have a range target of 50 Miles at 50 MPH. At 70 MPH, a 40% increase in speed, the distance would not be a 40% loss, but $50^{(1/1.4)}$ or about 16 miles. For giant OTR tires used in earth moving, the challenge is the same except at a fully loaded condition. Heat buildup in the tire is a function of the load capacity and the speed. Increased loads means increased tire deflection. Increased speed translates to an increase in cyclical flexing. For example, a 59/80R63 tire can carry 220,500 lbs at 87 psi at 30 mph up to 4 Miles one way (T&RA Yearbook). The speed and load are limited based on the heat buildup in the tire. In giant earth movers, tire internal air temperature is monitored and at a certain point the vehicle must be slowed or stopped to avoid tire damage. In large mines where these tires are used, the top three variable costs include tires, fuel and manpower. Prior attempts to cool tires include spraying a cooled liquid on the exterior of the tire and partially filling the interior cavity with a liquid to absorb the heat, transfer the heat to the rim, and then transfer the heat through a rotary coupling to the vehicle for cooling.

It would be advantageous to provide a new tire cooling system to remove the heat built-up in pneumatic tires due to load and speed conditions in order to extend their range.

BRIEF SUMMARY OF THE INVENTION

In one embodiment, a pneumatic tire is provided. The pneumatic tire includes a tread, an inner surface, and a heat exchanger. The tread may be configured to engage a ground surface. The inner surface may be positioned opposite the tread. The heat exchanger may be attached to the inner surface. The heat exchanger may have an inlet and an outlet.

Such a pneumatic tire may further include a first conduit and a second conduit. The first conduit may be connected to the inlet. The second conduit may be connected to the outlet. The first and second conduits may be detachably connected to the inlet and the outlet.

The heat exchanger of such a pneumatic tire may also include at least one passageway. The at least one passageway may be circumferentially disposed on the inner surface. The at least one passageway may include multiple loops.

The heat exchanger of such a pneumatic tire may be bonded to the inner surface of the pneumatic tire.

In another embodiment, a wheel assembly is provided. The wheel assembly includes a wheel rim, an internally cooled pneumatic tire, and a pump. The wheel rim may have an inner rim surface and an outer rim surface. The internally cooled pneumatic tire may include a tread, an inner tire surface, and an internal heat exchanger. The inner tire surface may be positioned opposite from the tread. The inner surface may further define a central cavity. The internal heat exchanger may be attached to the inner tire surface. The internal heat exchanger may have an internal exchanger inlet and an internal exchanger outlet. The pump may be connected to the internal exchanger inlet and the internal exchanger outlet.

Such a wheel assembly may also include a coolant disposed within the internal heat exchanger. The coolant may be configured to absorb heat from the internally cooled pneumatic tire.

The pump of such a wheel assembly may be positioned on the inner rim surface of the wheel rim outside of the central cavity.

Such a wheel assembly may also include an external heat exchanger. The external heat exchanger may be configured to remove heat from the coolant. The external heat exchanger may be coupled between the pump and the internal heat exchanger. The external heat exchanger may be positioned on the inner rim surface of the wheel rim outside of the central cavity. The external heat exchanger may be a heat pump. The external heat exchanger may further include an energy converter. The energy converted may be configured to recover heat from the coolant and convert it into electrical energy.

The wheel rim of such a wheel assembly may also include a first rim passageway and a second rim passageway. The first rim passageway may include a first inner rim connector and a first outer rim connector. The first inner rim connector may be connected to and extending from the inner rim surface. The first outer rim connector may be connected to and extending from the outer rim surface. The second rim passageway may include a second inner rim connector and a second outer rim connector. The second inner rim connector may be connected to and extending from the inner rim surface. The second outer rim connector may be connected to and extending from the outer rim surface. The first and the second inner rim connectors and the first and the second outer rim connectors may be configured to couple at least the pump and the internal heat exchanger.

The pump of such a wheel assembly may be electrically driven.

Such a wheel assembly may also include a fluid housed in the central cavity. The fluid may be used for transferring heat from the central cavity to the internal heat exchanger.

The internal heat exchanger of such a wheel assembly may be positioned circumferentially on the inner tire surface.

In another embodiment, a wheel assembly is provided. The wheel assembly includes a wheel rim, a pneumatic tire, a heat exchange conduit, and a pump. The pneumatic tire may be attached to the wheel rim. The pneumatic tire may include a central cavity defined between pneumatic tire and the wheel rim. The central cavity may include an inner cavity surface. The heat exchange conduit may be disposed on the inner cavity surface. The pump may be attached to the wheel rim and configured to rotate with the wheel rim. The pump is configured to couple to the heat exchange conduit.

The wheel rim of such a wheel assembly may include at least one rim passage open to the central cavity. The heat exchange conduit may be coupled to the pump through the at least one rim passage.

The pump of such a wheel assembly may be mechanically driven by a rotation of the wheel assembly.

Such a wheel assembly may also include an outside coolant to air heat exchanger. The outside coolant to air heat exchanger may be attached to the wheel rim and configured to rotate with the wheel rim. The outside coolant to air heat exchanger is configured to couple to the heat exchange conduit. The outside coolant to air heat exchanger may be configured to remove heat from a coolant. The outside coolant to air heat exchanger may be coupled between the heat exchange conduit and the pump.

Such a wheel assembly may also include an energy converter attach to the wheel rim. The energy converter may be configured to recover heat as electrical energy.

DETAILED DESCRIPTION OF THE INVENTION

Reference will now be made in detail to embodiments of the present disclosure, one or more drawings of which are set forth herein. Each drawing is provided by way of explanation of the present disclosure and is not a limitation. In fact, it will be apparent to those skilled in the art that various modifications and variations can be made to the teachings of the present disclosure without departing from the scope of the disclosure. For instance, features illustrated or described as part of one embodiment can be used with another embodiment to yield a still further embodiment.

Thus, it is intended that the present disclosure covers such modifications and variations as come within the scope of the appended claims and their equivalents. Other objects, features, and aspects of the present disclosure are disclosed in, or are obvious from, the following detailed description. It is to be understood by one of ordinary skill in the art that the present discussion is a description of exemplary embodiments only and is not intended as limiting the broader aspects of the present disclosure.

The words "connected", "attached", "joined", "mounted", "fastened", and the like should be interpreted to mean any manner of joining two objects including, but not limited to, the use of any fasteners such as screws, nuts and bolts, bolts, pin and clevis, and the like allowing for a stationary, translatable, or pivotable relationship; welding of any kind such as traditional MIG welding, TIG welding, friction welding, brazing, soldering, ultrasonic welding, torch welding, inductive welding, and the like; using any resin, glue, epoxy, and the like; being integrally formed as a single part together; any mechanical fit such as a friction fit, interference fit, slidable fit, rotatable fit, pivotable fit, and the like; any combination thereof; and the like.

Unless specifically stated otherwise, any part of the apparatus of the present disclosure may be made of any appropriate or suitable material including, but not limited to, metal, alloy, polymer, polymer mixture, wood, composite, or any combination thereof.

Figure 1:
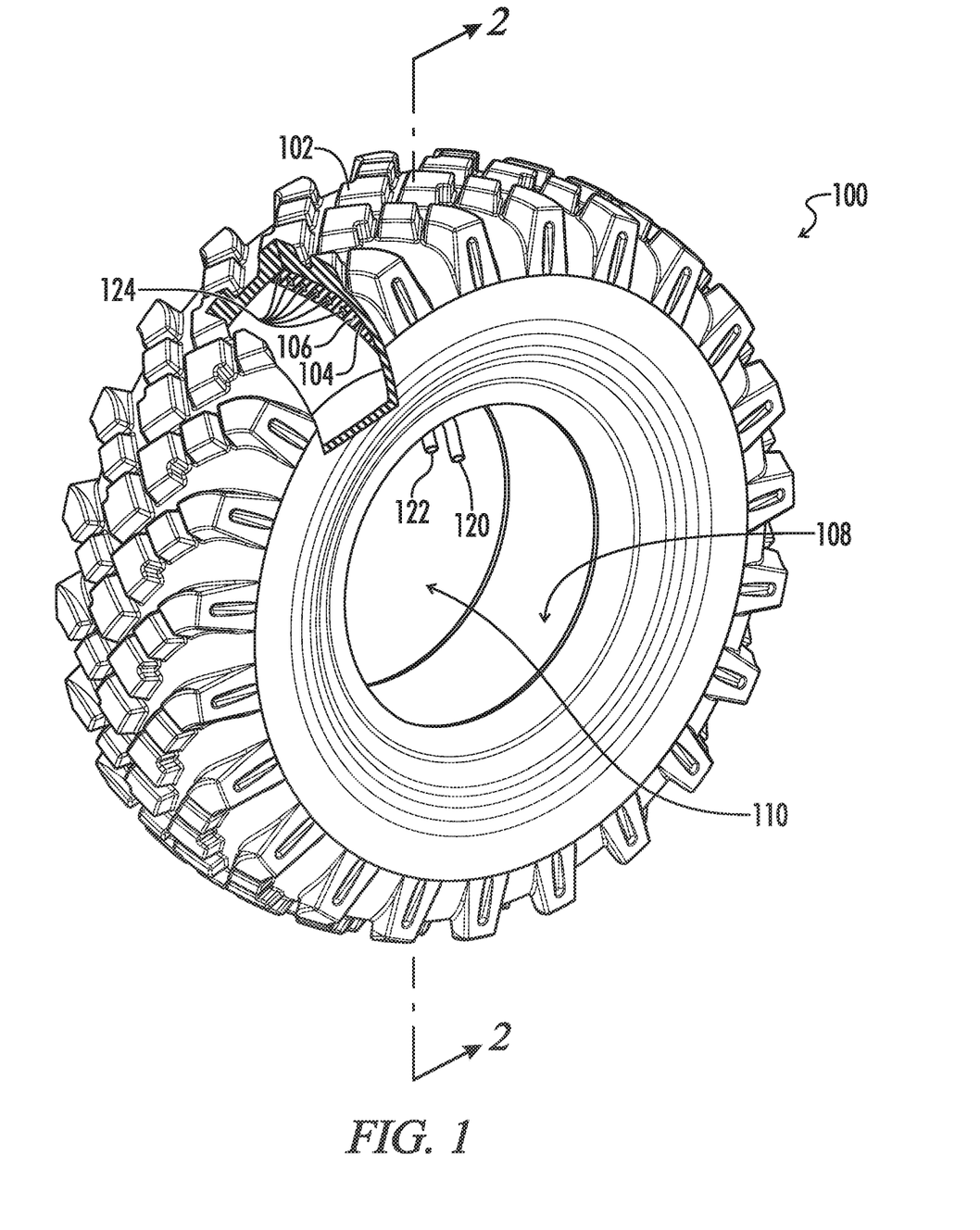
FIG. 1 is a perspective view with a partial cross-section of a pneumatic tire in accordance with an embodiment of the present invention.
Figure 2:
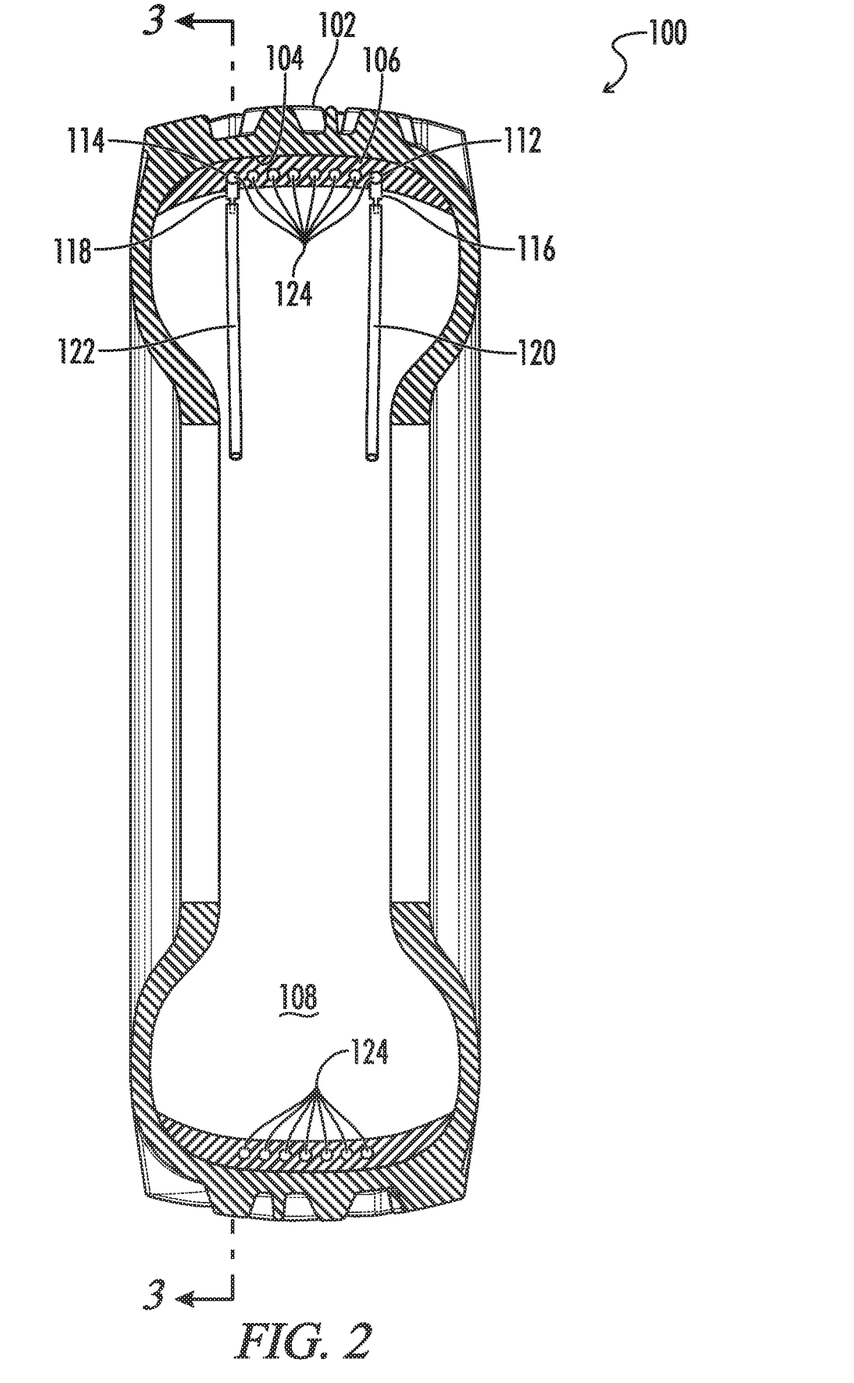
FIG. 2 is a cross-sectional view of the pneumatic tire of FIG. 1 taken along line 2-2.
Figure 3:
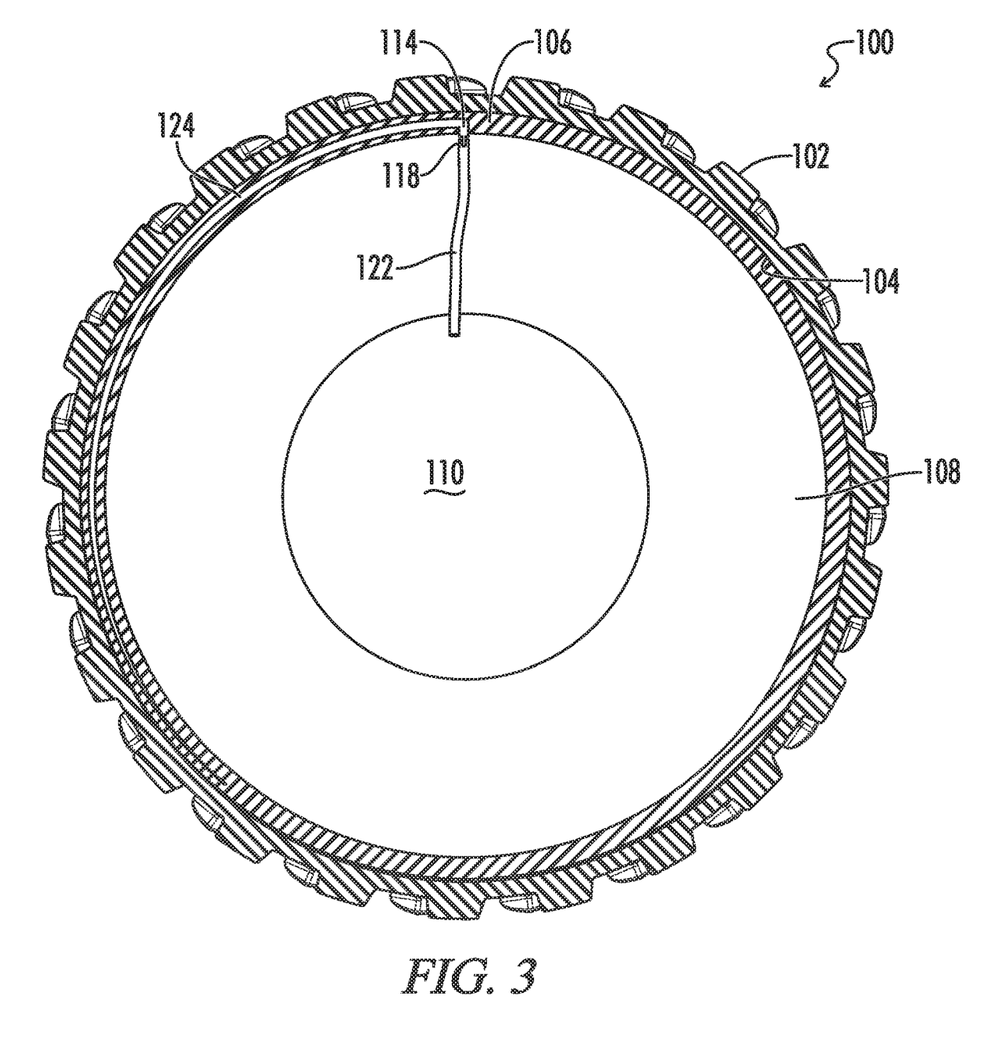
FIG. 3 is a cross-sectional view of the pneumatic tire of FIG. 2 taken along line 3-3.

Referring to FIGS. 1-3, a pneumatic tire 100 is shown. The pneumatic tire 100 may be referred to as an internally cooled pneumatic tire 100. The pneumatic tire 100 may include a tread 102, an inner tire surface 104, and an interior heat exchanger 106. The tread 102 is configured to engage a ground surface (not shown).

The inner tire surface 104 is positioned opposite the tread 102. The inner tire surface 104 may be referred to as an inner surface 104 or an inner cavity surface 104. The inner tire surface 104 may define a central cavity 108 within the tire. The central cavity 108 may surround and be open to a cylindrical tire opening 110 through the pneumatic tire 100. The central cavity 108 may be referred to as a central tire cavity 108.

The interior heat exchanger 106 may be attached to the inner tire surface 104. The interior heat exchanger 106 may be referred to as a heat exchanger 106 or a heat exchange conduit 106. The interior heat exchanger 106 may include an interior exchanger inlet 112 and an interior exchanger outlet 114. The interior exchanger inlet 112 may be referred to as an inlet 112. The interior exchanger outlet 114 may be referred to as an outlet 114.

As can best be seen in FIG. 2, the pneumatic tire 100 may include an inlet connector 116 and an outlet connector 118. The inlet connector 116 may be attached to the interior exchanger inlet 112. The outlet connector 118 may be attached to the interior exchanger outlet 114. The pneumatic tire 100 may further include a first internal conduit 120 and a second internal conduit 122. The first internal conduit 120 may be attached to the inlet 112 using the inlet connector 116. The second internal conduit 122 may be attached to the outlet 114 using the outlet connector 118. The first and second internal conduits 120, 122 may be detachably connected to the inlet and outlet connectors 116, 118, respectively.

As can best be seen in FIGS. 2-3, the internal heat exchanger 106 may include at least one passageway 124. The at least one passageway 124 may be positioned circumferentially around the pneumatic tire 100 along the inside tire surface 104. As can best be seen in FIG. 3, the at least one passageway 124 may form multiple loops or a coil around the inside tire surface 104.

In the illustrated embodiment, the heat exchanger 106 is bonded to the inside tire surface 104. In other embodiments, the heat exchanger 106 may be integrally formed on the inside tire surface 104 during a manufacturing process of the pneumatic tire 100.

In the illustrated embodiment as seen in FIG. 2, the heat exchanger 106 is positioned on a central portion of the inside tire surface 104 generally parallel with the tread 102 across the width of the tread 102 and positioned between the sidewalls. As further seen in FIG. 2 the heat exchanger 106 is also located between the sidewalls and includes at least one passageway 124 including multiple circumferential loops arranged in a layer extending generally parallel with the tread 102 across the width of the tread 102. In other embodiments (not shown), the heat exchanger 106 may be positioned on larger or smaller portions of the inside tire surface 104.

In some embodiments, the heat exchanger 106 may be formed from rubber similar to that of the pneumatic tire 100. In other embodiments, the heat exchanger may be formed from a different material (e.g., plastic, polyvinyl chloride, cross-linked polyethylene, copper pipe, or the like).

Referring to FIGS. 4-7, a wheel assembly 200 is shown. The wheel assembly 200 includes a wheel rim 202, the pneumatic tire 100, and a pump 204. The wheel rim 202 may include an inner rim surface 206 and an outer rim surface 208. The pneumatic tire 100 may be attached to the outer rim surface 208. The wheel rim 202 may occupy the cylindrical tire opening 110 when the pneumatic tire 100 is attached to the outer rim surface 208. The pump 204 may be coupled to the internal heat exchanger 106 using at least the first internal conduit 120 and the second internal conduit 122.

Figure 7:
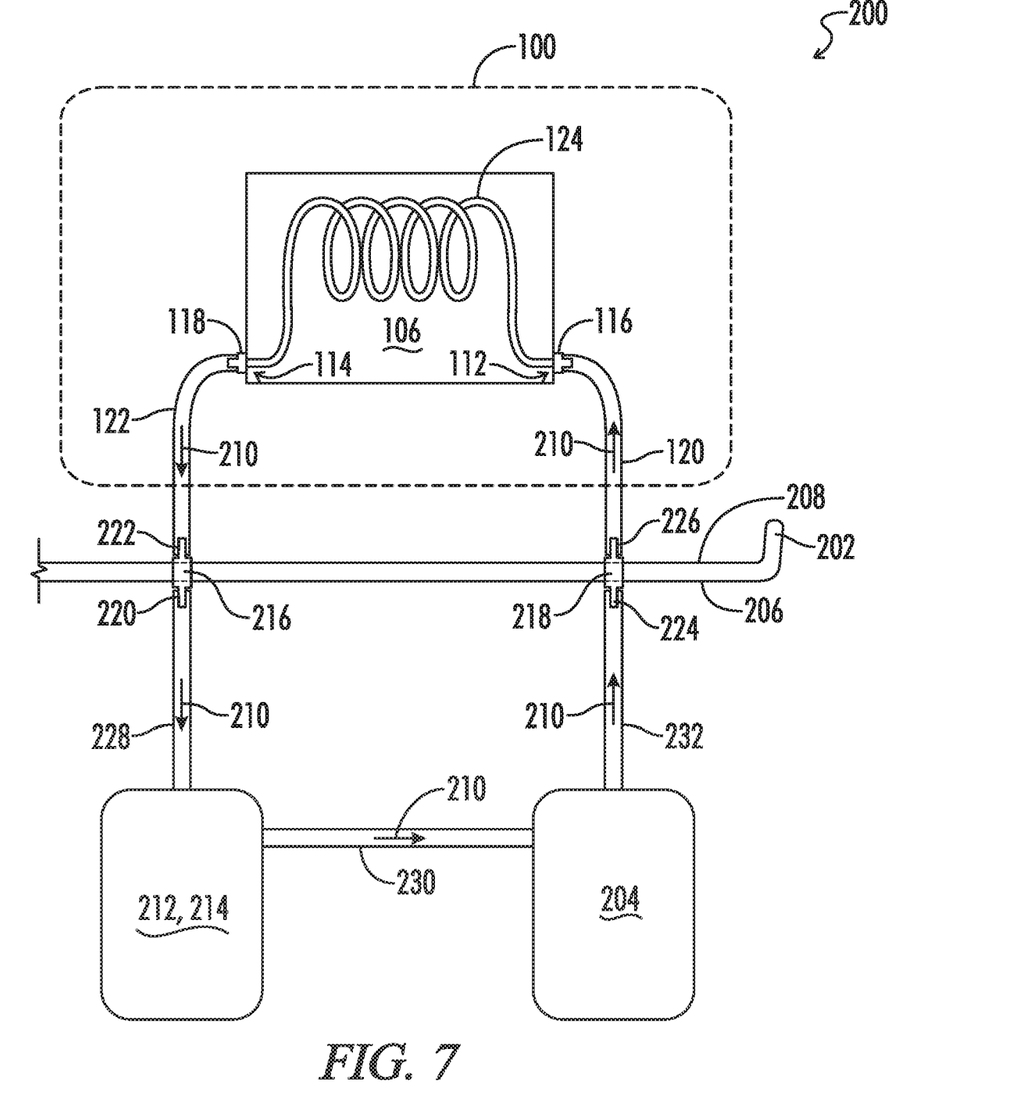
FIG. 7 is a schematic diagram of the wheel assembly of FIG. 4.

As can best be seen in FIG. 7, the wheel assembly 200 may also include a coolant 210 disposed within the at least one passageway 124 of the internal heat exchanger 106. The coolant 210 is configured to absorb heat from the pneumatic tire 100. The coolant 210 is preferably a liquid such as antifreeze or oil. Other coolants 210, including gases, may be used. It is preferable that the coolant 210 selected have advantageous heat transfer characteristics and have no deleterious effect on the material from which the pneumatic tire 100 is composed. The pump 204 is configured to circulate the coolant 210 through the at least one passageway 124 of the internal heat exchanger 106 of the pneumatic tire 100. In some embodiments, the coolant 210 may be pressurized.

Figure 4:
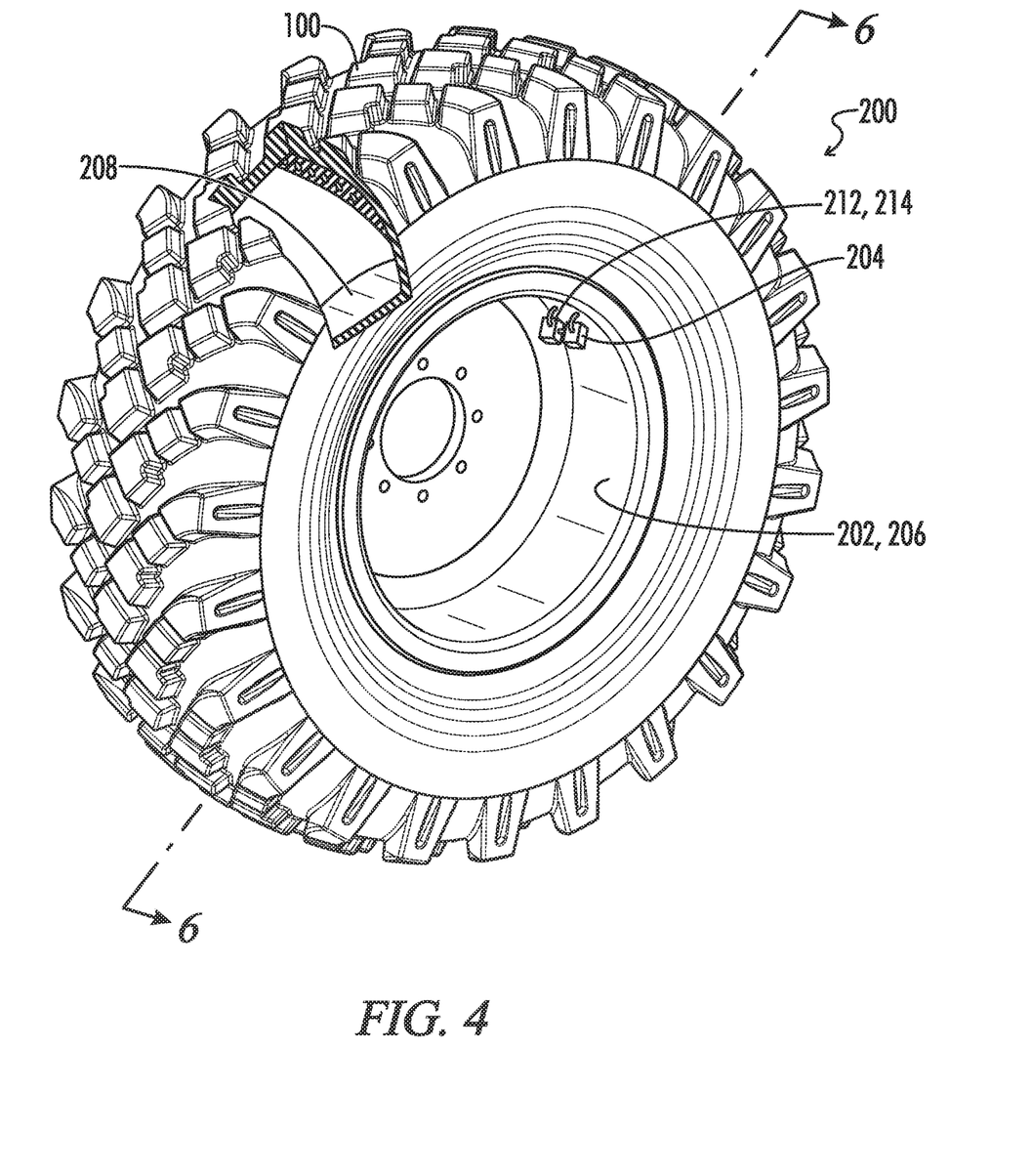
FIG. 4 is a perspective view with a partial cross-section of a wheel assembly in accordance with another embodiment of the present invention.
Figure 6:
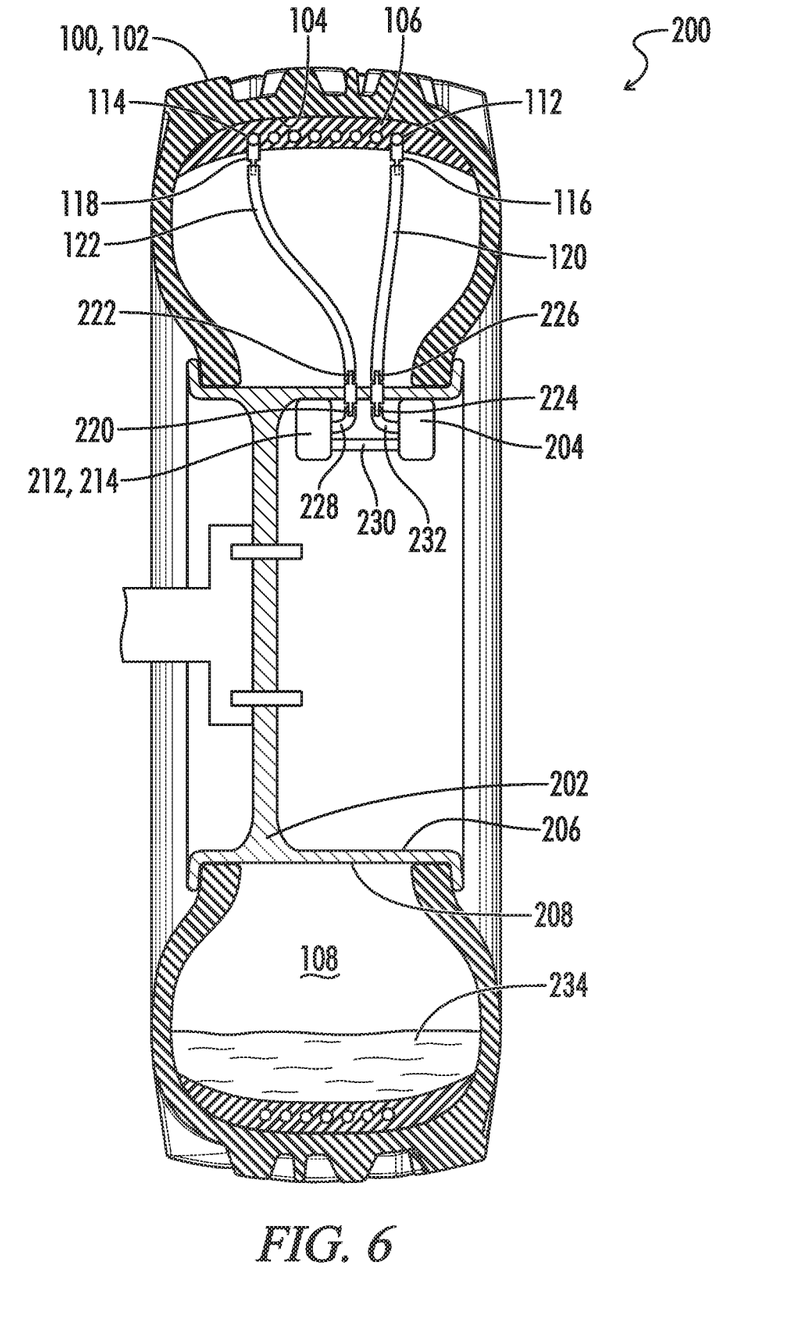
FIG. 6 is a cross-sectional view of the wheel assembly of FIG. 4 taken along line 6-6.

As can best be seen in FIGS. 4 and 6, the pump 204 may be positioned on the inner rim surface 206 outside the central cavity 108. In other embodiments (not shown), the pump may be positioned inside the central cavity. The pump 204 may be configured to rotate with the wheel rim 202.

In some embodiments, pump 204 may be mechanically driven by a rotation of the wheel rim 202. The pump 204 may be a gravity pump. In the preferred embodiment, the gravity pump may be a positive-displacement pump such as a free piston type cycloid pump, which may use gravity and wheel rotation to create reciprocation (i.e., as the piston or weight reaches the top, it falls due to gravity, which causes the fluid beneath the piston to be displaced). During wheel rotation, a piston inside the free piston type cycloid pump will move in the direction of gravity and thereby causing a positive displacement. Other types of gravity pumps may be used including rotary vane pumps, gravitational plunger pumps, diaphragm pumps, peristatic pumps, or the like. These other types of pumps will need to be altered in order to effectively use gravity to operate the pump. In other embodiments, the pump 204 may be electrically driven. The electrically driven pump may be powered using a battery (not shown). The battery may either be mounted on the wheel or on the frame of the vehicle. If the battery carried by the frame of the vehicle, then the electrically driven pump may be connected to the battery using slip-ring electrical connectors.

The wheel assembly 200 may also include an external heat exchanger 212. The external heat exchanger 212 may also be referred to as an outside coolant to air heat exchanger 212. The external heat exchanger 212 may be positioned on the outer rim surface 208 outside of the central cavity 108. The external heat exchanger 212 may be configured to rotate with the wheel rim 202. The external heat exchanger 212 may be configured to remove heat from the coolant 210. As shown the external heat exchanger 212 is positioned outside of the pump 204. In other embodiments (not shown), the external heat exchanger 212 and the pump 204 may be combined.

Figure 5:
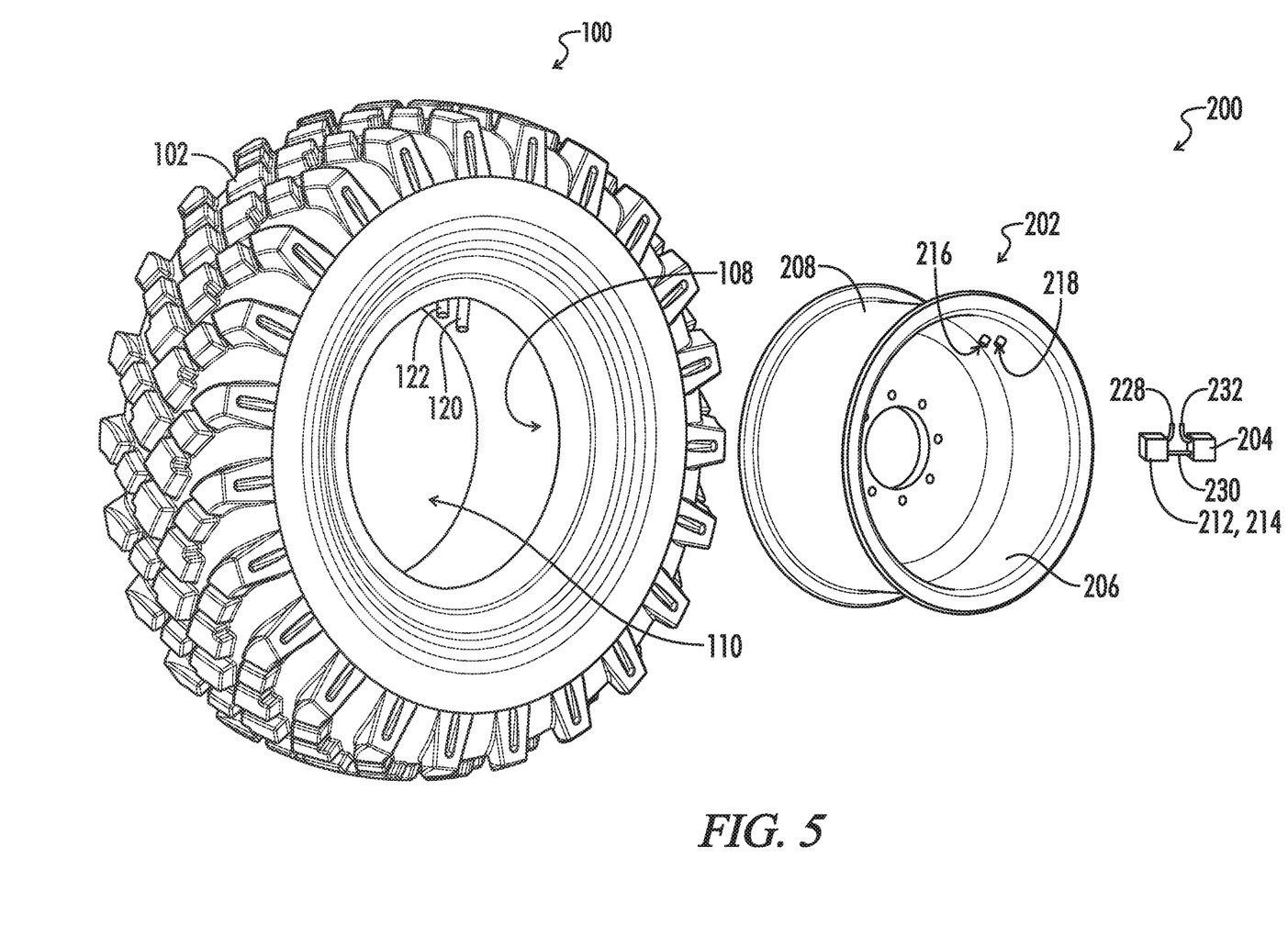
FIG. 5 is an exploded perspective view of the wheel assembly of FIG. 4.

As can best be seen in FIGS. 4-5, the external heat exchanger 212 may be coupled in-line with the pump 204 and the internal heat exchanger 106. By coupling the external heat exchanger 212 in-line, the coolant 210 may flow through the external heat exchanger 212, the pump 204, and the at least one passageway 124 of the internal heat exchanger 106.

In some embodiments (not shown), the external heat exchanger 212 may include a heat pump housed either within or outside of the pump 204. The heat pump may use a vapor-compression refrigeration method to remove heat from the coolant and cool the coolant. The heat pump may be powered similar to the electrically driven pump. In other embodiments, the outside coolant to air heat exchanger 212 may naturally exchange heat with the surrounding air as the coolant 210 flows through it. The natural exchange method may incorporate a fan (not shown) to dissipate the heat.

As can best be seen in FIG. 7, the outside coolant to air heat exchanger 212 may further include an energy converter 214. The energy converter may be configured to recover heat from the coolant 210 and convert it into electrical energy. The energy converter 214 may be referred to as a thermoelectric generator 214. A thermoelectric generator is a solid state device that converts heat flux (temperature differences) directly into electrical energy through a phenomenon called the "Seebeck effect" (a form of thermoelectric effect). In this case, the thermal gradient between two dissimilar conductors can produce electricity. The electrical energy generated may be used to power the pump 202 or associated wheel sensors (not shown). The electrical energy generated may also be used as storage or transferred to the vehicle.

As can best be seen in FIGS. 5 and 7, the wheel rim 202 of the wheel assembly 200 may further include a first rim passageway 216 and a second rim passageway 218. Each of the first and second rim passageways 216, 218 span between the inner rim surface 206 and the outer rim surface 208. The first rim passageway 216 includes a first inner rim connector 220 extending from the inner rim surface 206 and a first outer rim connector 222 extending from the outer rim surface 208. The second rim passageway 218 includes a second inner rim connector 224 extending from the inner rim surface 206 and a second outer rim connector 226 extending from the outer rim surface 208. The first and second inner rim connectors 220, 224 may be coupled between at least the pump 204 and the internal heat exchanger 106.

As can best been seen in FIG. 7, the wheel assembly may include a first external conduit 228, a second external conduit 230, and a third external conduit 232. The first, second, and third external conduits 228, 230, 232 may be used to connect the pump 204 and the external heat exchanger 212 to the first and second inner rim connectors 220, 224. For example, the first external conduit 228 may be connected between the first inner rim connector 220 and the external heat exchanger 212. The second external conduit 230 may be connected between the external heat exchanger 212 and the pump 204. The third external conduit 232 may be connected between the pump 204 and the second inner rim connector 224. One of skill in the art will appreciate that the positions of the pump 204 and the external heat exchanger 212 may be switched.

Again, as can best be seen in FIG. 7, the first and second internal conduits 120, 122 may be used to connect the internal heat exchanger 106 to the first and second outer rim connectors 222, 226. For example, the first internal conduit 120 may be connected between the inlet connector 116 of the internal heat exchanger 106 and the second outer rim surface connector 226. The second internal conduit 122 may be connected between the outlet connector 118 of the internal heat exchanger 106 and the first outer rim surface connector 222.

In some embodiments, the wheel assembly 200 may include check and directional valves (not shown) positioned between at least the pump 202 and the internal heat exchanger 106.

As can best be seen in FIG. 6, the wheel assembly 100 may further include a fluid 234 disposed in and partially filling the central cavity 108 of the pneumatic tire 100. The fluid 234 may be configured to absorb heat from the central cavity 108 and transfer the absorbed heat to the internal heat exchanger 106. The fluid 234 may increase the efficiency with which the heat exchanger 106 can remove heat from the pneumatic tire 100. The fluid 234 may have properties similar to those of the coolant 210.

Thus, although there have been described particular embodiments of the present invention of a new and useful INTERNALLY COOLED TIRE-WHEEL SYSTEM it is not intended that such references be construed as limitations upon the scope of this invention except as set forth in the following claims.

What is claimed is:

1. A pneumatic tire comprising:
a pair of sidewalls;
a tread for engaging a ground surface, the tread extending between the sidewalls;
an inner tire surface opposite the tread, the inner tire surface including a central portion generally parallel with the tread across a width of the tread and located between the sidewalls; and
a heat exchanger attached to the central portion of the inner tire surface and located between the sidewalls, the heat exchanger including at least one passageway including multiple circumferential loops arranged in a layer extending generally parallel with the tread across the width of the tread, each circumferential loop extending completely around a circumference of the tire, the heat exchanger further including an inlet connected to the at least one passageway for providing coolant to the at least one passageway and an outlet connected to the at least one passageway for receiving coolant from the at least one passageway.

2. The pneumatic tire of claim 1, further comprising a first conduit connected to the inlet and a second conduit connected to the outlet.

3. The pneumatic tire of claim 2, wherein the first and second conduits are detachably connected to the inlet and outlet using connectors.

4. The pneumatic tire of claim 1, wherein the heat exchanger is bonded to the inner tire surface.

5. The pneumatic tire of claim 1, wherein the heat exchanger is integrally formed on the inner tire surface during formation of the pneumatic tire.

6. The pneumatic tire of claim 1, wherein the heat exchanger is formed from a rubber material.

7. The pneumatic tire of claim 1, wherein the heat exchanger is formed from a plastic material.

8. The pneumatic tire of claim 1, wherein the heat exchanger is formed from a polyvinyl chloride material.

9. The pneumatic tire of claim 1, wherein the heat exchanger is formed from a cross-linked polyethylene material.

10. The pneumatic tire of claim 1, wherein the multiple circumferential loops of the at least one passageway form a coil around the inside tire surface.

11. The pneumatic tire of claim 1, wherein the at least one passageway is defined by a coiled pipe embedded in a body of the heat exchanger formed of a rubber material.

12. A pneumatic tire comprising:
a pair of sidewalls;
a tread for engaging a ground surface, the tread extending between the sidewalls;
an inner tire surface opposite the tread, the inner tire surface including a central portion generally parallel with the tread across a width of the tread and located between the sidewalls; and
a heat exchanger bonded to or integrally formed with the central portion of the inner tire surface and located between the sidewalls, the heat exchanger including a coiled pipe embedded in a rubber material, the coiled pipe extending in multiple complete circumferential loops arranged in a layer extending generally parallel with the tread across the width of the tread, each loop extending around a circumference of the tire for conducting a coolant to cool the tire, the coiled pipe having an inlet for receiving coolant from outside of the tire and an outlet for discharging coolant from the coiled pipe.

13. The pneumatic tire of claim 12, further comprising a first conduit connected to the inlet and a second conduit connected to the outlet.

14. The pneumatic tire of claim 13, wherein the first and second conduits are detachably connected to the inlet and outlet using connectors.

15. The pneumatic tire of claim 12, wherein the heat exchanger is bonded to the inner tire surface.

16. The pneumatic tire of claim 12, wherein the heat exchanger is integrally formed on the inner tire surface during formation of the pneumatic tire.

* * * * *